United States Patent [19]

Nakatani et al.

[11] Patent Number: 5,546,440
[45] Date of Patent: Aug. 13, 1996

[54] X-RAY DIAGNOSTIC APPARATUS

[75] Inventors: Yoshinori Nakatani; Toyomitsu Kanebako, both of Tochigi-ken; Kunio Aoki, Yaita; Hiroshi Asahina, Tochigi-ken, all of Japan

[73] Assignee: Kabushiki Kaisha Toshiba, Kawasaki, Japan

[21] Appl. No.: 299,969

[22] Filed: Sep. 2, 1994

[30] Foreign Application Priority Data

Sep. 2, 1993 [JP] Japan .................................. 5-218501

[51] Int. Cl.⁶ ...................................................... A61B 6/00
[52] U.S. Cl. .......................................... 378/98.2; 378/106
[58] Field of Search ................................. 378/62, 91, 92, 378/98, 98.2, 98.7, 98.8, 98.12, 101, 106, 115, 114, 116

[56] References Cited

U.S. PATENT DOCUMENTS

| | | | |
|---|---|---|---|
| 4,412,247 | 10/1983 | Herbaschek | 378/98.2 |
| 4,555,728 | 11/1985 | Fenster et al. | 378/98.2 |
| 4,628,355 | 12/1986 | Ogura et al. | 378/98.2 X |
| 4,658,413 | 4/1987 | Nishioka et al. | 378/98.2 |
| 4,905,264 | 2/1990 | Ogura | 378/98.2 |
| 5,107,528 | 4/1992 | Asahina et al. | 378/98.2 |
| 5,400,383 | 3/1995 | Yassa et al. | 378/98.2 |

*Primary Examiner*—David P. Porta
*Attorney, Agent, or Firm*—Oblon, Spivak, McClelland, Maier & Neustadt, P.C.

[57] ABSTRACT

An X-ray diagnostic apparatus repeatedly radiates pulse-like X-rays, repeatedly images X-rays passing through an object to be examined at a predetermined frame period, and sequentially displays a plurality of images thus obtained repeatedly. In this invention, the exposure dose can be reduced since the number of X-ray irradiation times per unit time is set to be smaller than the number of frames to be imaged per unit time.

24 Claims, 13 Drawing Sheets

FIG. 11A VSP

FIG. 11B X-RAY PULSE

FIG. 11C OUT SIGNAL FROM TV CAMERA
FIG. 11D

BUFFER MEMORY WRITTING CONTROL SIGNAL

FIG. 11E READ OUT DATA FROM BUFFER MEMORY
FIG. 11F

SWITCHING CONTROL SIGNAL FOR SWITCH 28

FIG. 11G WRITE DATA IN IMAGE MEMORY

FIG. 11H READ OUT DATA FROM IMAGE MEMORY

X-RAY DIAGNOSTIC APPARATUS

BACKGROUND OF THE INVENTION

1. Field of the Invention

The present invention relates to an X-ray diagnostic apparatus for obtaining moving images.

2. Description of the Related Art

An X-ray diagnostic apparatus of this type can examine motions inside the body of a patient by fluoroscopy in real time; that is, an X-ray diagnostic apparatus images X-rays transmitted through a patient repeatedly at a period of 30 frames per second by using a TV camera via an image intensifier or a fluorescent screen, while radiating pulse X-rays repeatedly at a period of 30 times per second. This fluoroscopic technique is essential in diagnoses using a catheter.

In this catheter diagnosis, however, not only patients but also doctors and nurses cannot avoid exposure. To reduce the exposure dose, two methods are possible. The first method is to decrease the energy of pulse X-rays. Unfortunately, the first method has the inconvenience that the S/N ratio decreases with decreasing energy, and this results in degradation of the image quality. The second method is to decrease the number of irradiation times per unit time (one second) without lowering the energy of pulse X-rays. The second method, however, has the disadvantage of being unable to smoothly observe motions inside the body of a patient, and also has the following problem. Generally, TV cameras are so designed as to have a frame rate of 30 frames/sec as a basic specification. If the number of irradiation times is reduced to be smaller than 30 per second while the frame rate is kept unchanged at 30 frames/sec, photoelectric conversion periods in which no X-rays are radiated take place periodically. Output signals obtained from a TV camera during this period have no gray-scale information. Therefore, white images periodically mix in moving images to make observations very difficult. Note that orders of the frame rate other than 30 frames/sec are unpreferred since the cost of a TV camera is extremely increased.

SUMMARY OF THE INVENTION

It is an object of the present invention to provide an X-ray diagnostic apparatus capable of reducing the exposure dose.

To achieve the above object, the present invention provides an X-ray diagnostic apparatus comprising X-ray radiating means for repeatedly radiating pulse-like X-rays, imaging means for repeatedly imaging X-rays passing through an object to be examined at a predetermined frame period, display means for sequentially displaying a plurality of images repeatedly obtained by the imaging means, and control means for controlling the X-ray radiating means such that the number of X-ray irradiation times per unit time is smaller than the number of frames which the imaging means images per unit time.

In addition, the present invention provides an X-ray diagnostic-apparatus comprising first X-ray radiating means for repeatedly radiating pulse-like X-rays, first imaging means for repeatedly imaging X-rays radiated from the first X-ray radiating means and passing through an object to be examined at a predetermined frame period, first display means for sequentially displaying a plurality of images repeatedly obtained by the first imaging means, second X-ray radiating means for repeatedly radiating pulse-like X-rays, second imaging means for repeatedly imaging X-rays radiated from the second X-ray radiating means and passing through the object to be examined at a predetermined frame period, second display means for sequentially displaying a plurality of images repeatedly obtained by the second imaging means, and control means for controlling the first and second X-ray radiating means such that the number of X-ray irradiation times per unit time of the first and second X-ray radiating means is smaller than the number of frames which the first and second imaging means image per unit time, and that the first and second X-ray radiating means radiate X-rays at different timings.

Also, the present invention provides an X-ray diagnostic apparatus comprising X-ray radiating means for repeatedly radiating pulse-like X-rays, imaging means for repeatedly imaging X-rays passing through an object to be examined at a predetermined frame period, image processing means for processing the images obtained by the imaging means, display means for sequentially displaying the images processed by the image processing means, and control means for controlling the X-ray radiating means such that the number of X-ray irradiation times per unit time is smaller than the number of frames which the imaging means images per unit time, and controls the image processing means such that an image obtained by the imaging means when the X-ray radiating means radiates no X-rays is not processed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of an X-ray diagnostic apparatus according to the present invention will be described below with reference to the accompanying drawings.

(1st Embodiment)

Figure 1:
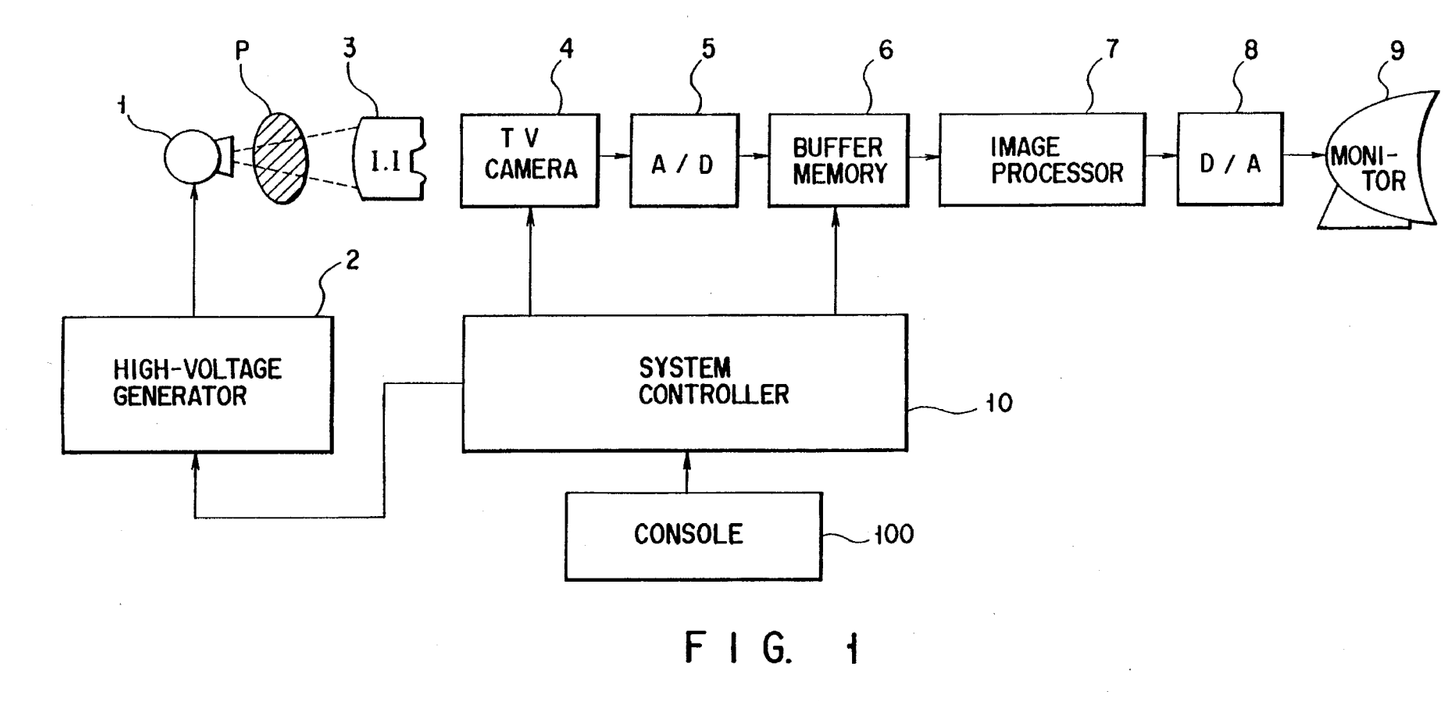
FIG. 1 is a block diagram showing the arrangement of the first embodiment of an X-ray diagnostic apparatus according to the present invention.
Figures 2A, 2B, 2C, 2D:
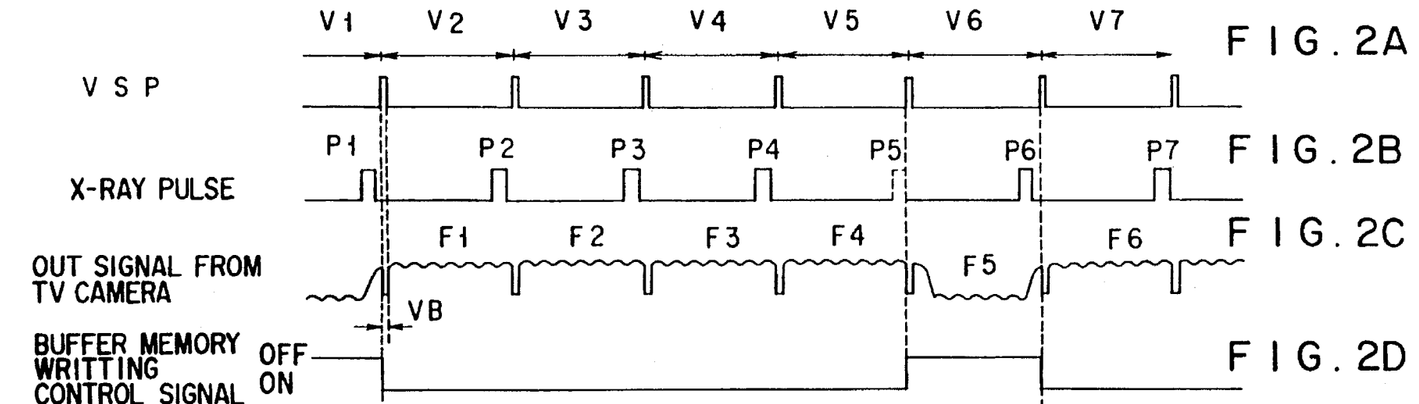
FIGS. 2A–2E are timing charts for explaining a thinning method according to the embodiment in FIG. 1.
Figure 2E:
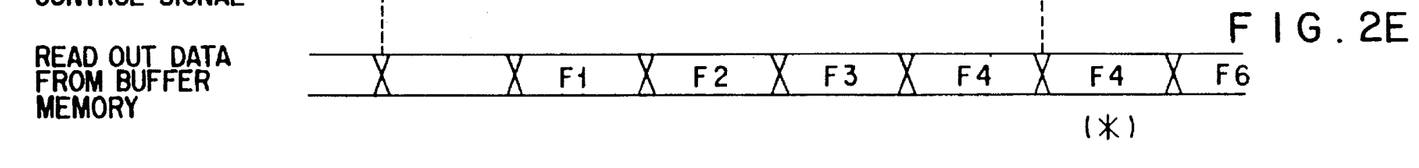
Figure 3A:
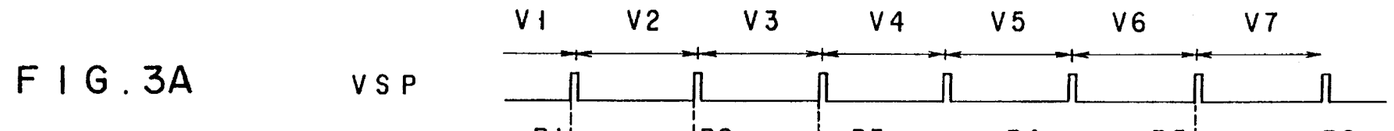
FIGS. 3A–3E are timing charts for explaining an equal-interval method according to the embodiment in FIG. 1.
Figure 3B:
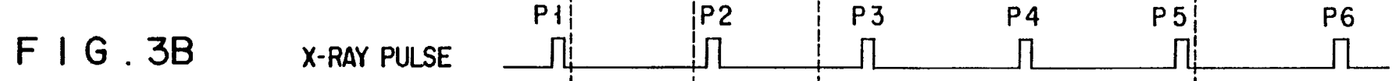
Figure 3C:
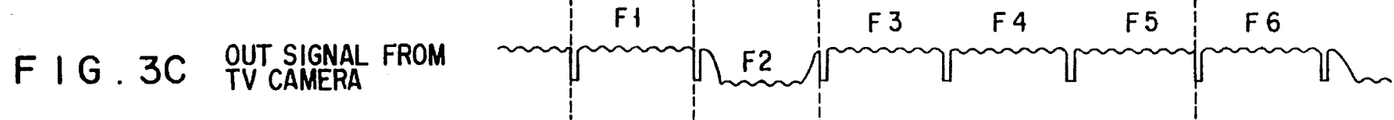
Figure 3D:
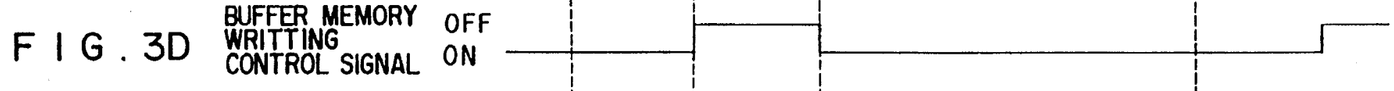
Figure 3E:
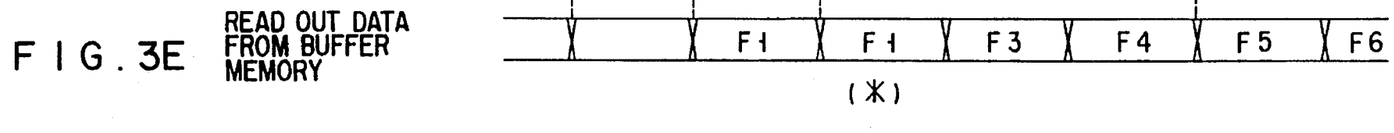

FIG. 1 shows the arrangement of the first embodiment of the X-ray diagnostic apparatus of the present invention. Referring to FIG. 1, an X-ray tube 1 and a high-voltage generator 2 constitute an X-ray radiating means. Upon receiving a trigger signal from a system controller 10, the high-voltage generator 2 applies a pulse-like high voltage (tube voltage) to the X-ray tube 1. Consequently, the X-ray tube 1 irradiates pulse-like X-rays onto an object P to be examined.

An image intensifier (I.I) 3, as an X-ray-to-light converting means for converting X-rays into light, converts X-ray images transmitted through the object P into optical images. The image intensifier 3 can be naturally replaced with a fluorescent screen. The optical images are formed on the imaging plane of a TV camera 4 by an optical system (not shown). The TV camera 4 picks up the optical images and outputs analog signals.

The TV camera 4 operates at a frame frequency of 30 Hz together with a monitor 9 and generates an image of 30 frames per second. This TV camera 4 can be either a camera tube or a solid-state image sensor. The solid-state image sensor can be of either a CCD type or a MOS type. The CCD solid-state image sensor can be of any of a frame transfer type, an interline transfer type, and a frame interline transfer type. In this embodiment, a description will be made assuming that the TV camera 4 is a frame-transfer-type CCD solid-state image sensor.

The system controller 10 outputs a trigger signal to the high-voltage generator 2 such that the number of times per second of X-ray irradiation from the X-ray tube 1 is smaller than 30, the number of frames of the TV camera 4.

A console 100 is connected to the system controller 10. When a particular knob of the console 100 is operated by an operator, the system controller 10 alters the number of X-ray irradiation times within a range of 15 to 24 times/sec. Note that this knob can also be a switch for selecting a portion to be diagnosed, such as the chest or the abdominal region. Different portions have different motion velocities. In the abdominal region which is relatively slow in motion, smooth motions can be obtained even with irradiation performed a number of times one-half the frame number, i.e., 15 times per second or more. In the chest which is relatively rapid in motion, a number of irradiation times of 24 per second is required in order to avoid unnatural motions. The system controller 10 stores the numbers of irradiation times corresponding to a plurality of types of portions to be diagnosed in an internal memory. The system controller 10 loads the number of irradiation times by using a portion selected by the switch as an address, thereby setting the number of irradiation times.

Analog signals from the TV camera 4 are converted into digital data by an analog-to-digital converter (A/D) 5 and supplied to a buffer memory 6. The write operation to the buffer memory 6 is executed when a write signal is supplied from the system controller 10, and is not executed when no write signal is supplied. The data written in the buffer memory 6 is read out in accordance with a read control signal from the system controller 10. The readout data is displayed on the high-definition monitor 9 of, e.g., 1024× 1024 pixels via an image processor 7 and a digital-to-analog converter (D/A) 8. The image processor 7 performs image processing such as edge emphasis.

The operation of the apparatus of this embodiment will be described below. In this embodiment, two kinds of methods are provided in order that the number of times per unit time (one second) of X-ray irradiation from the X-ray tube 1 be smaller than the number (30) of frames which the TV camera 4 images per unit time (one second). One is a thinning method, and the other is an equal-interval method. In the thinning method, X-rays are radiated repeatedly at the same period as the frame period, i.e., a period of 1/30 second, and this irradiation is paused once for every n irradiations. In the equal-interval method, X-rays are radiated at an equal-interval period longer than the frame period.

FIGS. 2A–2E show the operation of the thinning method. A vertical sync pulse VSP is generated repeatedly at a frame frequency of 30 Hz. The TV camera 4 as a frame-transfer-type CCD solid-state image sensor is constituted by a photoelectric conversion unit, a storage unit, and a horizontal transfer unit. An electric charge is stored in the photoelectric conversion unit in a frame period (photoelectric conversion period) V1 and transferred at once to the storage unit in a vertical blanking period BK. The storage of charge is restarted in the next frame period V2. In this frame period V2, the charge stored in the storage unit is read out in units of lines from the horizontal transfer unit. In a solid-state image sensor of this sort, one frame period is delayed from the timing of image pickup to the timing of read out. Such an operation is repeatedly executed to read out signals of frames F1, F2, F3, F4, . . . , in this order from the TV camera 4.

X-rays are radiated repeatedly at the same period of 1/30 second as the frame period. In addition, the irradiation of X-rays is paused once for every n irradiations. If n=5, for example, the number of X-ray irradiation times per second is thinned from 30 to 24. Therefore, a signal of the frame F5 corresponding to a frame period V5 during which no X-rays are radiated contains only noise information rather than gray-scale information.

The signals of the frames F1, F2, F3, F4, . . . , from the TV camera 4 are digitized by the ADC 5 and supplied in this order to the buffer memory 6. When the data of the frames F1, F2, F3, F4, F6, . . . , corresponding to the frame periods V1, V2, V3, V4, V6, . . . , during which X-rays are radiated are supplied to the buffer memory 6, the system controller 10 supplies a write signal to the buffer memory 6. Consequently, the data of the frames F1, F2, F3, F4, F6, . . . , having information of X-ray images are written in the buffer memory 6. When the data of the frame F5 corresponding to the frame period V5 during which no X-rays are radiated is supplied to the buffer memory 6, the system controller 10 supplies no write signal to the buffer memory 6. Therefore, the data of the frame F5 having no information of X-ray images is not written in the buffer memory 6.

The data written in the buffer memory 6 are read out with a delay of one frame under the read control of the system controller 10 and displayed on the monitor 9 via the image processor 7 and the digital-to-analog converter 8. As indicated by symbol * in FIG. 2, the data of the frame F4 which is imaged in the frame period V4 immediately before the frame period V5 during which no X-rays are radiated is repeatedly read out twice from the buffer memory 6. Therefore, the image of the frame F4 is displayed on the monitor 9 over two frame periods. That is, by this write and read control for the buffer memory 6, the frame F5 in the frame period V5 during which no X-ray irradiation is performed is replaced with the frame F4 in the immediately preceding frame period V4 during which X-ray irradiation is performed, and the image of this frame F4 is displayed.

When an operator operates the switch for selecting a portion to be diagnosed, such as the chest or the abdominal region, on the console 100, the number of X-ray irradiation times is changed within a range of 15 to 24 times/sec. If the abdominal region which is relatively slow in motion is chosen, the number of irradiation times is set to one-half of the frame number, i.e., 15 per second. Natural motions can be obtained even with this number of irradiation times. If the chest which is relatively rapid in motion is chosen, the number of irradiation times is set to 24 per second. Since this number of irradiation times of 24 per second is equal to the frame number of a cinema, no unnatural motions result.

FIGS. 3A–3E show the operation of the equal-interval method. The read operation from the TV camera 4, the write and read operations for the buffer memory 6, and the irradiation number changing operation are identical with those of the thinning method.

In the equal-interval method, irradiation of X-rays is repeated at fixed periods of, e.g., 1/24 second which is longer than the frame period. This period can be varied within a range of 1/15 to 1/24 second. In this interval method, as in the thinning method, a frame F2 having no information of X-ray images is generated periodically. As in the case of the thinning method, the data of this frame F2 is not written in the buffer memory 6. Also, the data of a frame F1 imaged in a frame period V1 which is immediately before a frame period V2 and in which X-rays are radiated is repeatedly read out twice from the buffer memory 6, and the image of the frame F1 is displayed on the monitor 9 over two frame periods.

As discussed above, since the number of irradiation times can be decreased without changing the frame frequency, the exposure dose can be reduced. Additionally, since frames having no X-ray image information are not displayed, noise images are not mixed in moving images. Furthermore, images continue smoothly because, instead of a frame having no X-ray image information, a frame which is imaged immediately before that frame and has X-ray image information is displayed again. Note that successively displaying frames before and after a frame having no X-ray image information, without displaying this frame having no X-ray image information, leads to a reduction in the time duration of a moving image. However, no such inconvenience occurs in this embodiment.

(2nd Embodiment)

Figure 4:
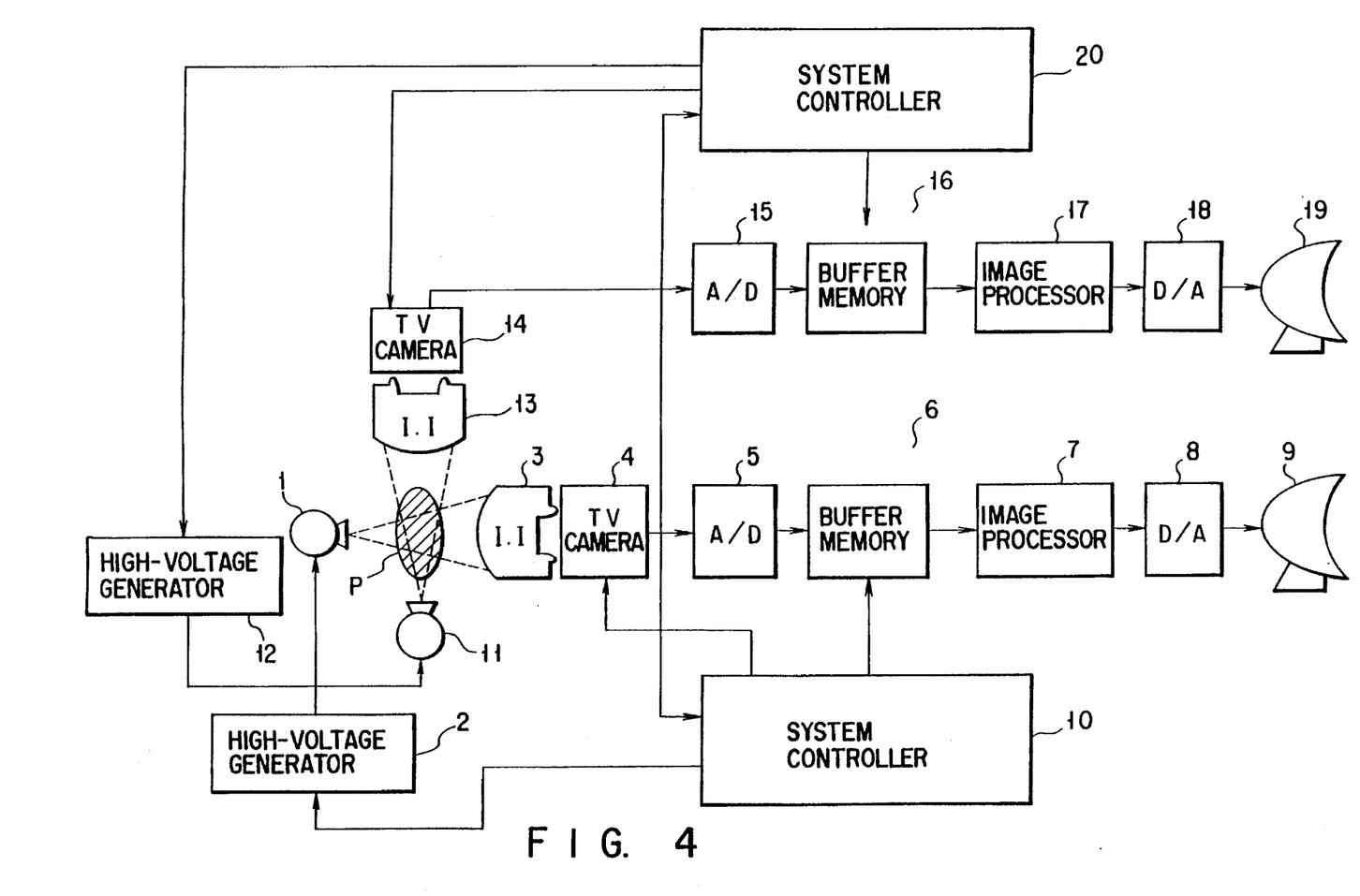
FIG. 4 is a block diagram showing the arrangement of the second embodiment of an X-ray diagnostic apparatus according to the present invention.
Figure 5A:
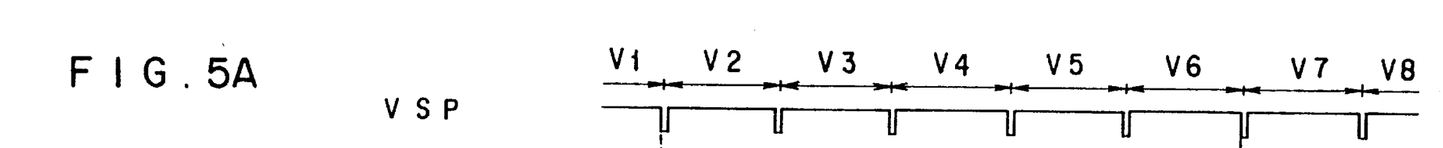
FIGS. 5A–5E are timing charts for explaining a thinning method according to the embodiment in FIG. 4.
Figure 5B:
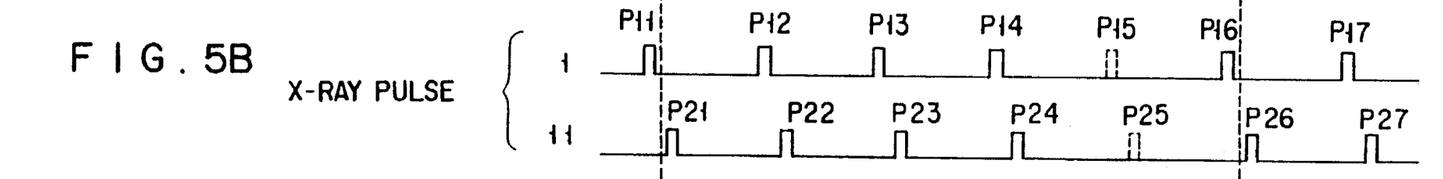
Figure 5C:
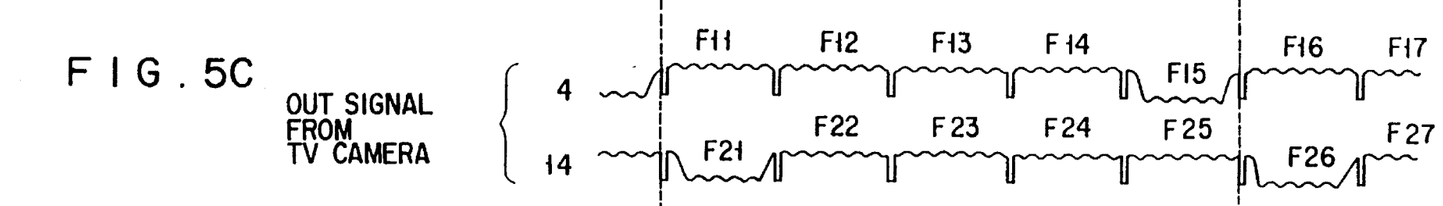
Figure 5D:
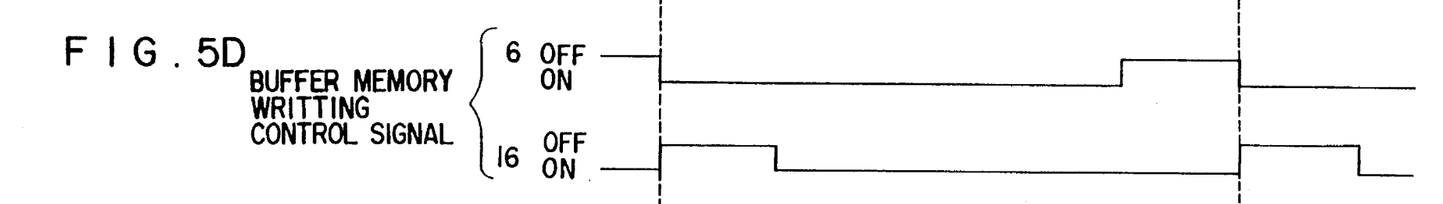
Figure 5E:
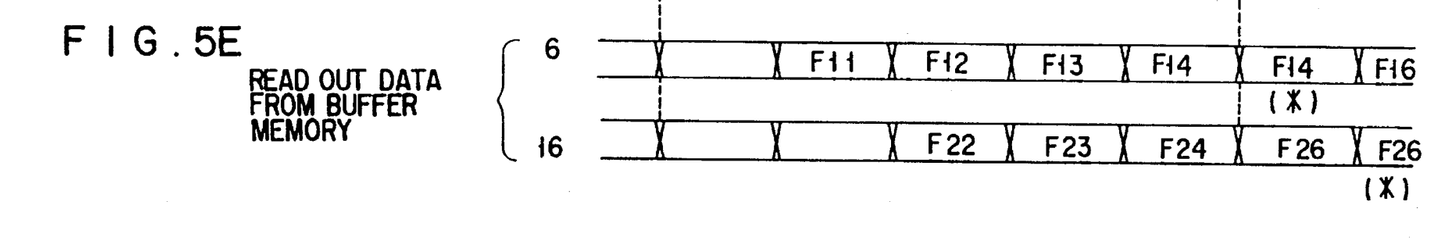
Figure 6A:
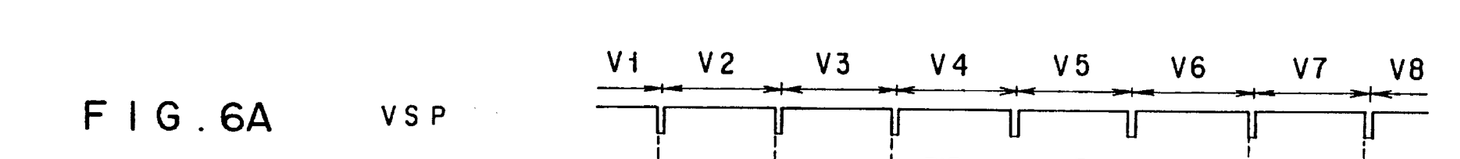
FIGS. 6A–6E are timing charts for explaining an equal-interval method according to the embodiment in FIG. 4.
Figure 6B:
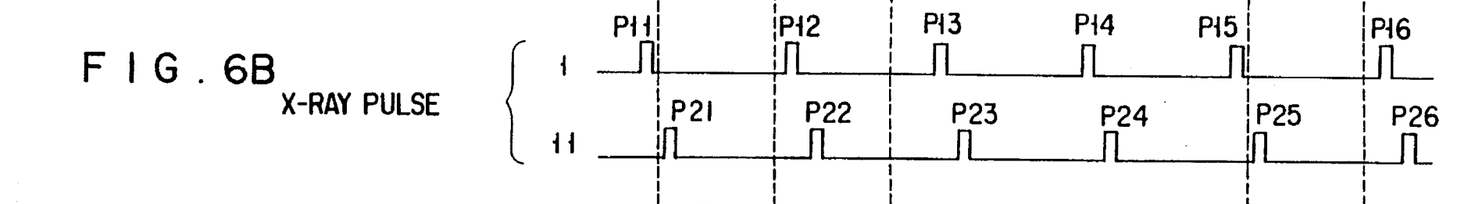
Figure 6C:
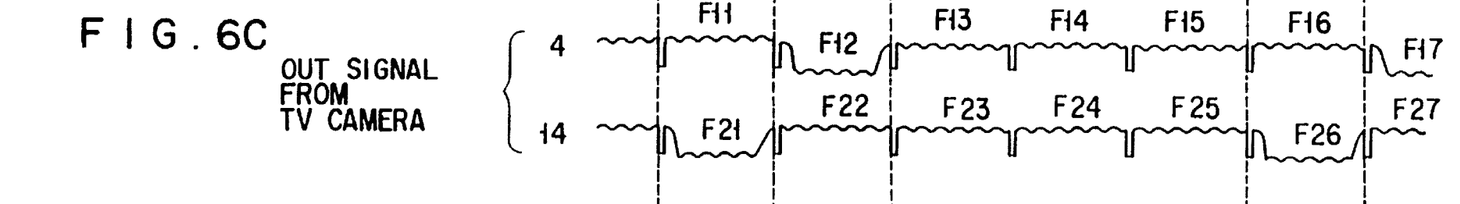
Figure 6D:
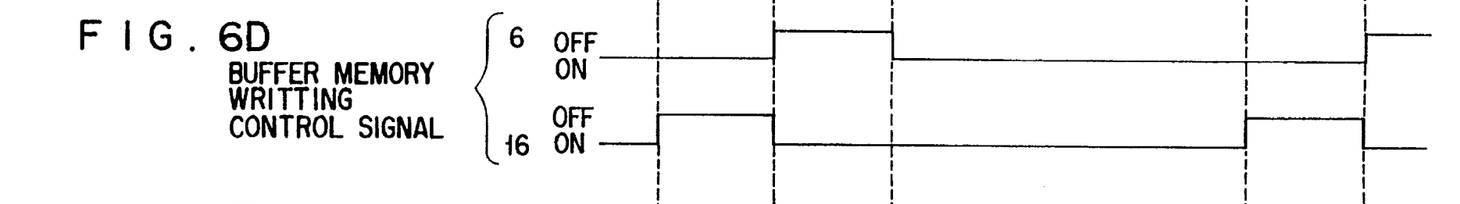
Figure 6E:
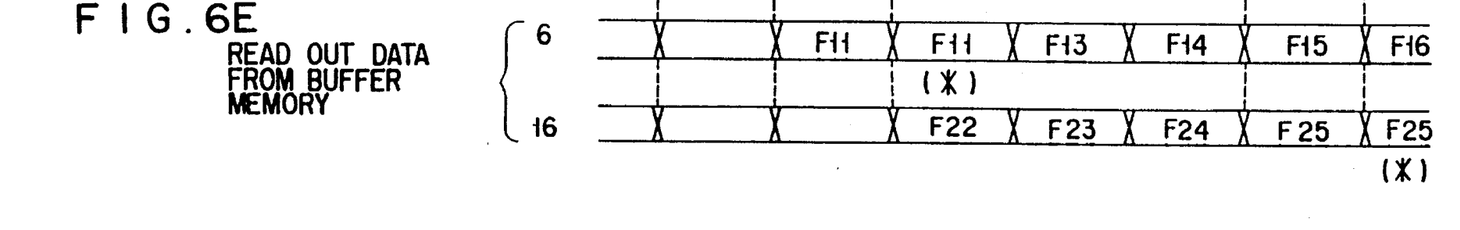

FIG. 4 shows the arrangement of the second embodiment of the present invention. In FIG. 4, the same reference numerals as in FIG. 1 denote the same parts, and a detailed description thereof will be omitted. An X-ray diagnostic apparatus of this second embodiment is of a biplane type capable of fluoroscopy simultaneously in two directions, i.e., from the front and from the side. This X-ray diagnostic apparatus is constituted by two X-ray diagnostic units each having the same construction as that of the apparatus of the first embodiment. The first X-ray diagnostic unit includes a plurality of components denoted by reference numerals 1 to 10. The second X-ray diagnostic unit includes a plurality of components denoted by reference numerals 11 to 20. The components 11 to 20 constituting the second diagnostic unit correspond to the components 1 to 10, respectively, constituting the first X-ray diagnostic unit.

FIGS. 5A–5E show the operation performed in a thinning method of the apparatus of the second embodiment. FIGS. 6A–6E show the operation performed in an equal-interval method of the apparatus. For each of the first and second X-ray diagnostic units, these operations of the thinning method and the equal-interval method are identical with those of the first embodiment. Therefore, in the biplane type X-ray diagnostic apparatus, the effect of reducing the exposure dose is doubled as compared with that of the first embodiment by the use of the thinning method or the equal-interval method.

The system controller 10 of the first X-ray diagnostic unit and the system controller 20 of the second X-ray diagnostic unit perform irradiation of X-rays at different timings; that is, during a frame period in which no X-rays are radiated in one unit, X-rays are always radiated in the other unit. Consequently, even if no X-ray images are obtained in a certain frame period by one X-ray diagnostic unit, X-ray images can be always obtained by the other X-ray diagnostic unit.

(3rd Embodiment)

Figure 7:
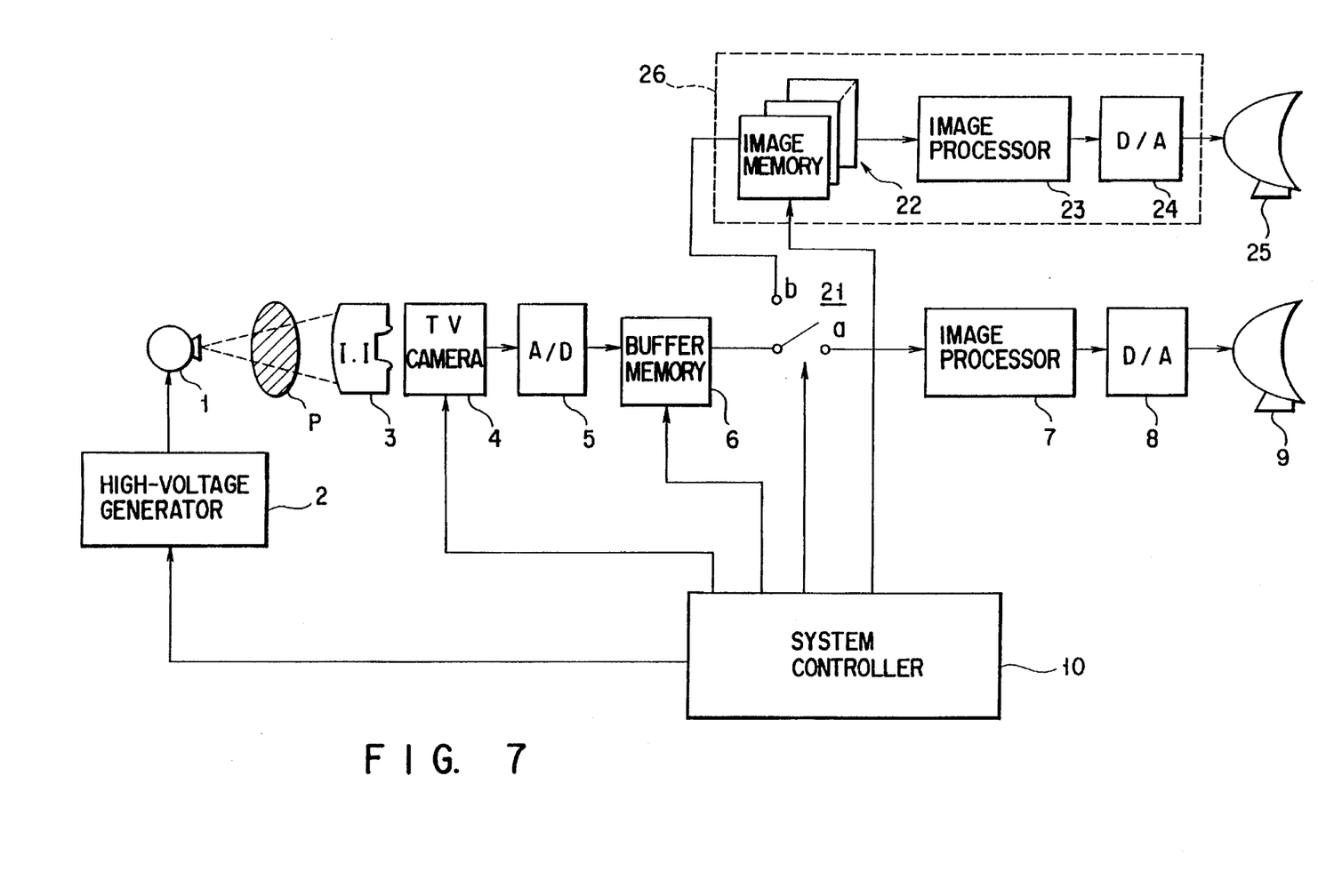
FIG. 7 is a block diagram showing the arrangement of the third embodiment of an X-ray diagnostic apparatus according to the present invention.
Figure 8A:
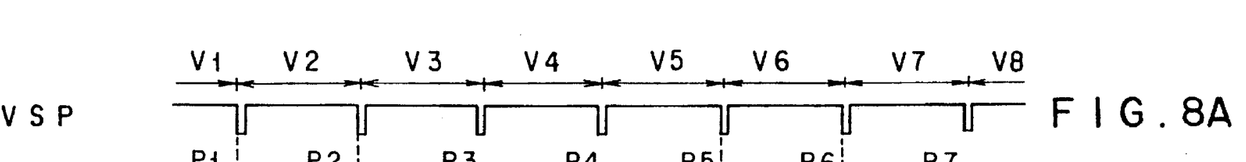
FIGS. 8A–8H are timing charts for explaining a thinning method according to the embodiment in FIG. 7.
Figures 8B, 8C:
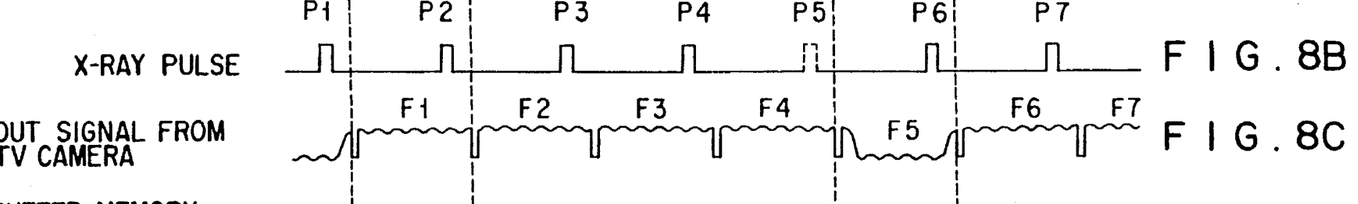
Figure 8D:
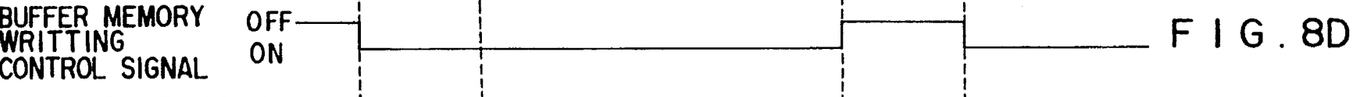
Figure 8E:
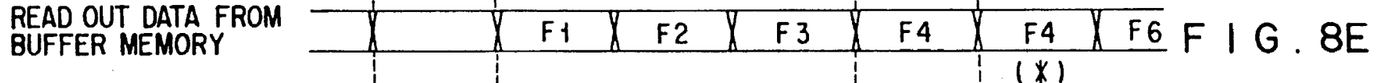
Figure 8F:
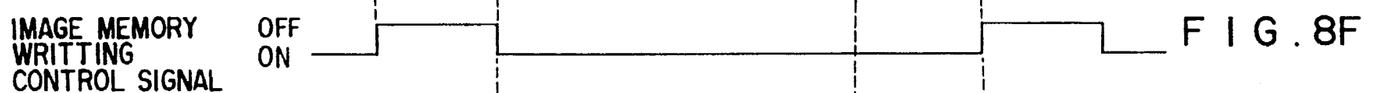
Figure 8G:
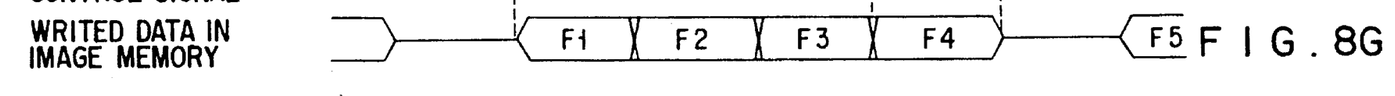
Figure 8H:
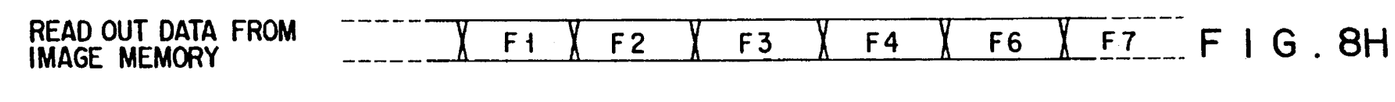
Figure 9A:
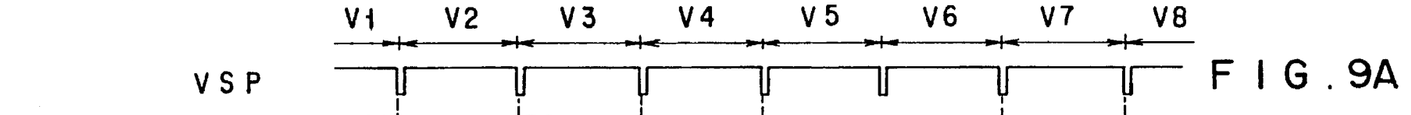
FIGS. 9A–9H are timing charts for explaining an equal-interval method according to the embodiment in FIG. 7.
Figure 9B:
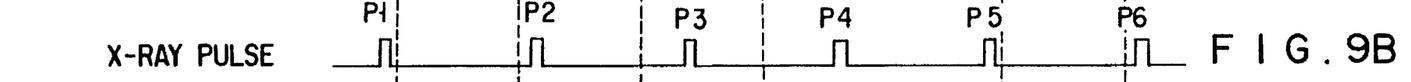
Figure 9C:
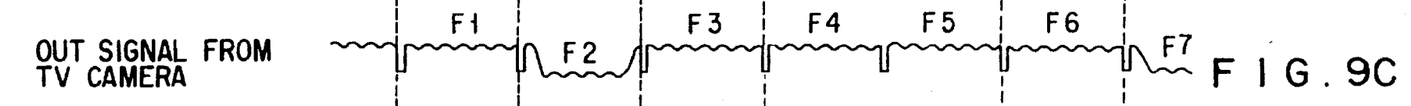
Figure 9D:
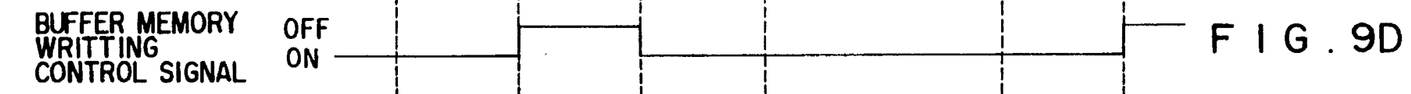
Figure 9E:
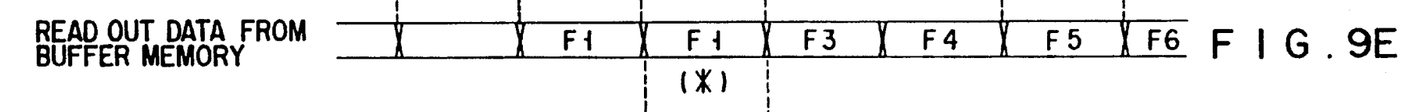
Figure 9F:
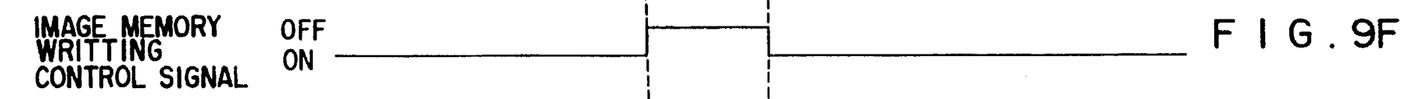
Figure 9G:
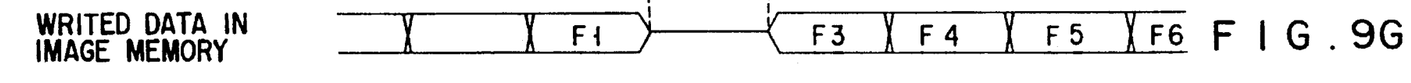
Figure 9H:
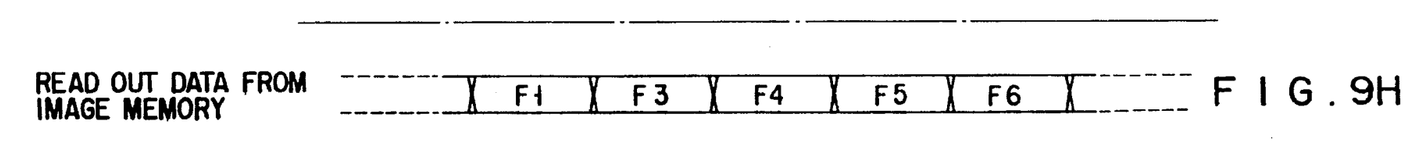

FIG. 7 illustrates the arrangement of an X-ray diagnostic apparatus according to the third embodiment of the present invention. In FIG. 7, the same reference numerals as in FIG. 1 denote the same parts, and a detailed description thereof will be omitted. A plurality of ordered images are obtained by the fluoroscopy. Each of images is converted a processed image by image processing such as subtraction processing in real time. The subtraction processing is image processing in which, after a contrast medium is injected into a blood vessel, subtraction is performed for images before and after the contrast medium reaches a portion of interest, thereby obtaining images of the blood vessel at a high contrast by erasing images other than the blood vessel.

An image processing unit 26 for performing this image processing and an image processor 7 are selectively connected to a buffer memory 6 via a switch 21. When the image processor 7 is used, the switch 21 is closed to a side a by a control signal from a system controller 10, connecting the image processor 7 to the buffer memory 6.

The image processing unit 26 includes a plurality of image memories (frame memories) 22, an image processor 23, and a digital-to-analog converter (D/A) 24.

A series of operations from X-ray irradiation to data read out from the buffer memory 6 are identical with those in the first embodiment. FIGS. 8A–8H are timing charts corresponding to a thinning method, and FIGS. 9A–9H are timing charts corresponding to an equal-interval method. The object of this embodiment is to efficiently execute image processing such as subtraction processing while using a series of the same operations from X-ray irradiation to data read out from the buffer memory 6 as in the first embodiment. This efficient image processing means that no image processing is executed for images obtained in a frame period during which no X-rays are irradiated, and that the image processing is executed once for one image. Image data obtained in a frame period immediately before a frame period during which no X-ray irradiation is performed is repeatedly read out from the buffer memory 6. In image processing such as subtraction processing, it is inefficient to repeat the image processing for the same image.

To achieve the above object of this embodiment, the system controller 10 controls the image memories 22 such that one image data is written once in each image memory 22. For this purpose, the system controller 10 turns off a write signal to the image memories 22 when the same image data is read out again from the buffer memory 6. More specifically, in the case of FIGS. 8A–8H, the write signal is turned off during a frame period V7 in which the data of a frame F4 which is read out in a frame period V6 is read out again. In the case of FIGS. 9A–9H, the write signal is turned off during a frame period V4 in which the data of a frame F1 which is read out in a frame period V3 is read out again. Therefore, one image obtained in a frame period during which X-ray irradiation is performed is written in each image memory 22.

The image data written in the image memories 22 are read out one image after another to the image processor 23 under the control of the system controller 10, and they are sequentially subjected to image processing such as subtraction processing. The processed data are converted into analog signals by the digital-to-analog converter 24, supplied to a high-definition monitor 25, and displayed.

In this embodiment as discussed above, it is possible to perform no image processing for an image obtained in a frame period during which no X-rays are radiated, and to execute image processing once for one image. It is also possible to use a series of the same operations from X-ray irradiation to data read out from the buffer memory 6 as in the first embodiment.

Figure 10:
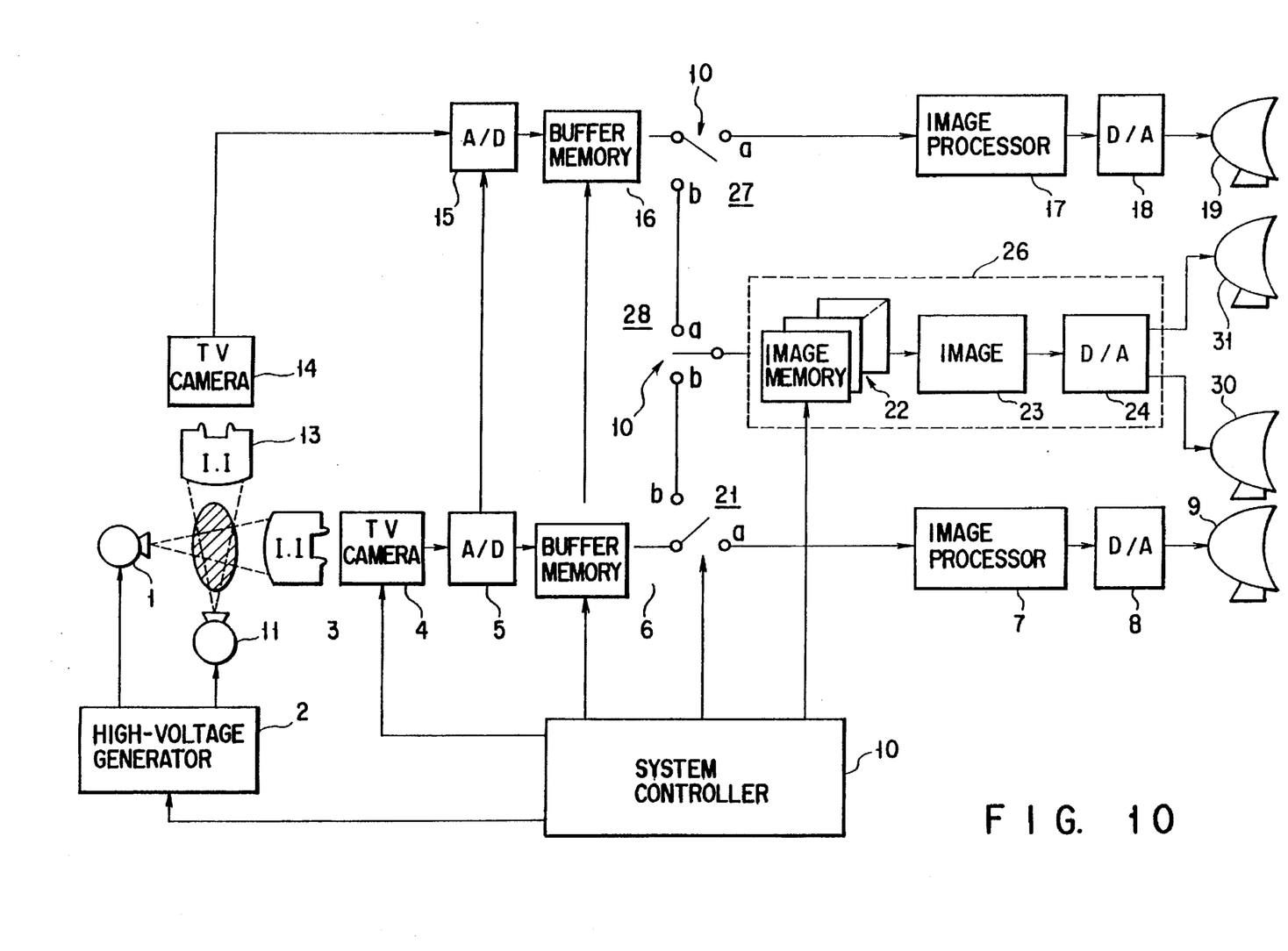
FIG. 10 is a block diagram showing the arrangement of the fourth embodiment of an X-ray diagnostic apparatus according to the present invention.
Figure 11A:
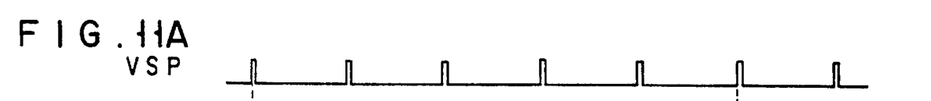
FIGS. 11A–11H are timing charts for explaining a thinning method according to the embodiment in FIG. 10.
Figure 11B:
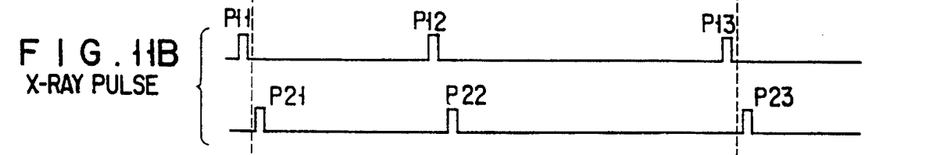
Figure 11C:
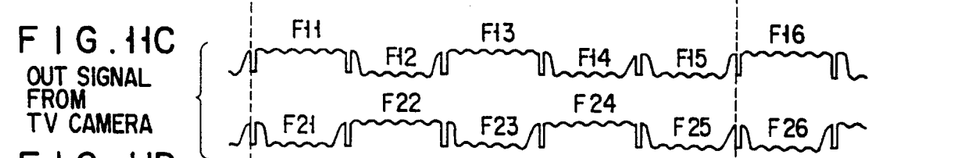
Figure 11D:
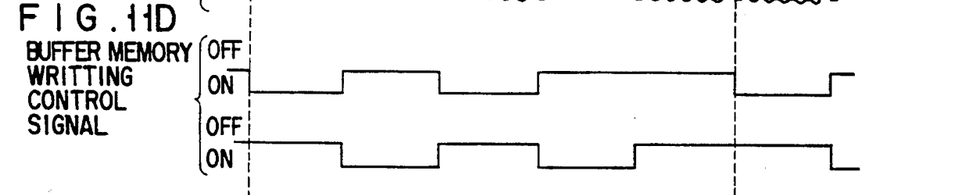
Figures 11E, 11F:
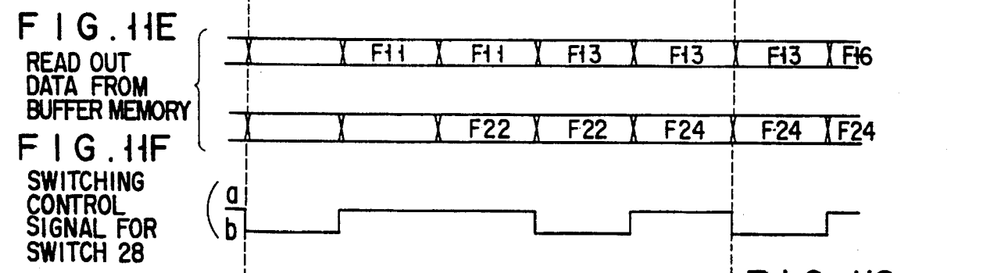
Figure 11G:
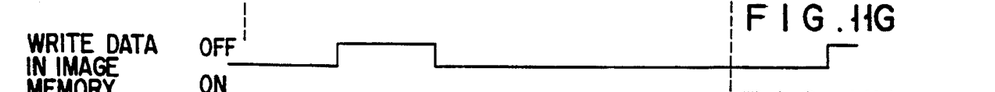
Figure 11H:
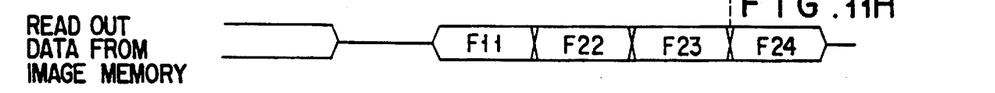
Figure 12A:
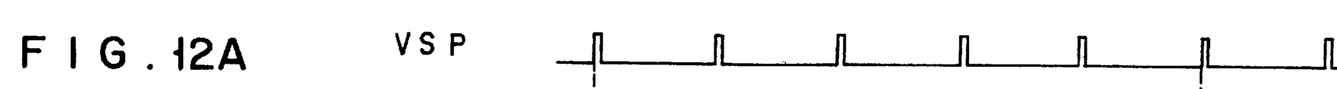
FIGS. 12A–12H are timing charts for explaining an equal-interval method according to the embodiment in FIG. 10.
Figure 12B:
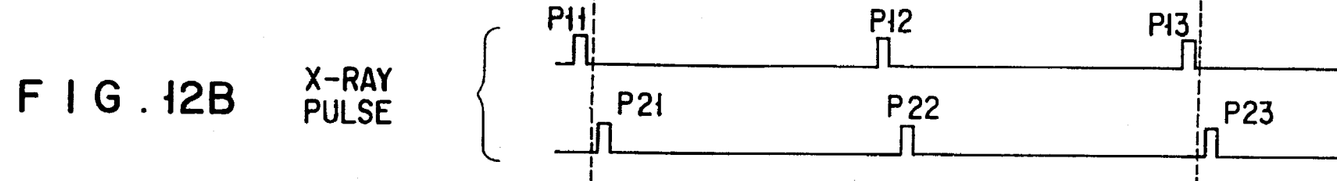
Figure 12C:
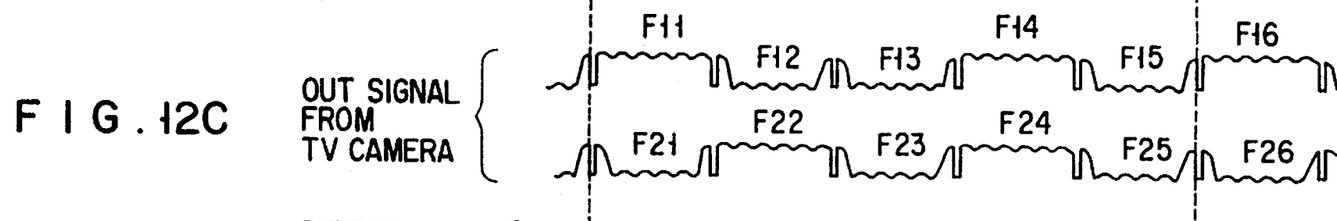
Figure 12D:
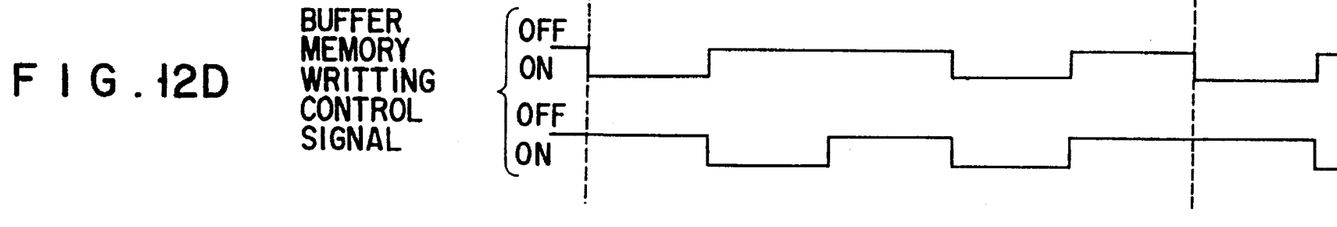
Figure 12E:
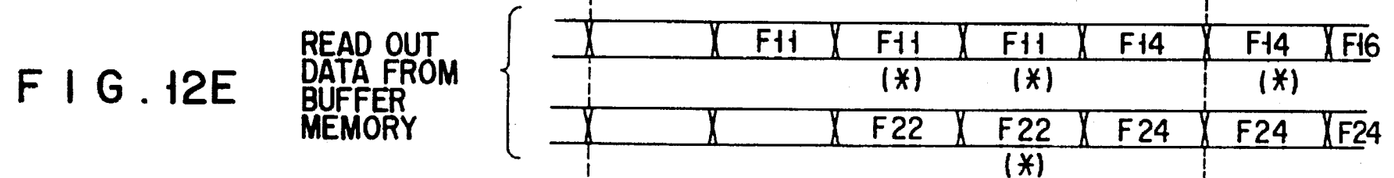
Figure 12F:
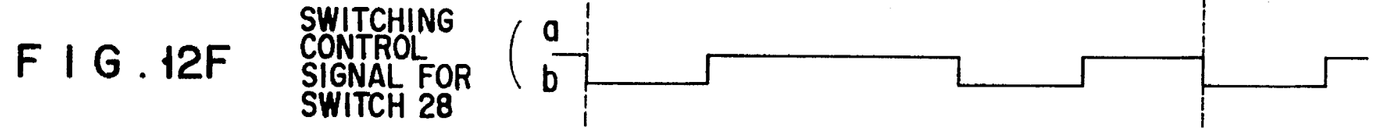
Figure 12G:
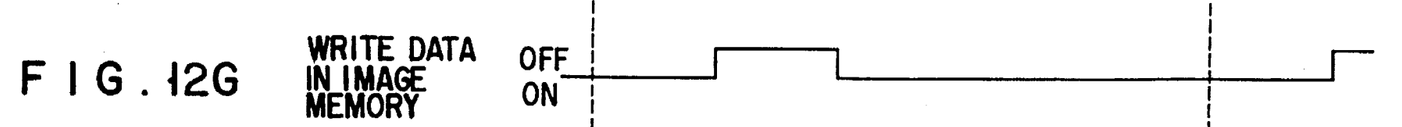
Figure 12H:
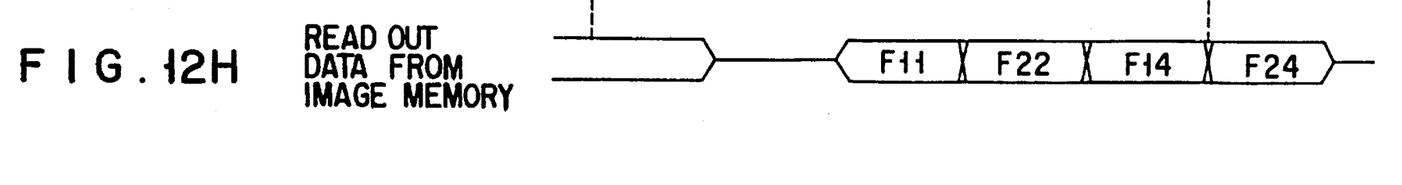

Note that the present invention is not limited to the above embodiments but can be practiced in the forms of various modifications. As an example, the apparatuses of the second and third embodiments can be combined as a single apparatus, as in FIG. 10. FIGS. 11A–11F are timing charts corresponding to a thinning method of this apparatus, and FIGS. 12A–12H are timing charts corresponding to an equal-interval method of the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An X-ray diagnostic apparatus comprising:
   X-ray radiating means for repeatedly radiating pulse-like X-rays during a fluoroscopic imaging operation;
   imaging means for repeatedly imaging X-rays passing through an object to be examined at a predetermined frame period and successively outputting image signals representing X-ray images obtained by the X-rays repeatedly radiated in each frame period; and
   display means for displaying X-ray fluoroscopic images on the basis of the image signals successively outputted by said imaging means; and
   control means for controlling said X-ray radiating means such that said X-ray radiating means radiates no X-rays in a specific frame period during the fluoroscopic imaging operation.

2. An apparatus according to claim 1, in which the number of frames is 30 per second.

3. An apparatus according to claim 1, in which said control means controls said X-ray radiating means such that the number of irradiation times is not less than one-half the number of frames.

4. An apparatus according to claim 1, in which said control means controls said X-ray radiating means such that X-rays are radiated at the same period as the frame period and the X-ray irradiation is paused once for every n irradiations.

5. An apparatus according to claim, 1, in which said control means controls said X-ray radiating means such that X-rays are radiated repeatedly at a period longer than the frame period.

6. An apparatus according to claim 1, in which said control means controls said display means such that, in place of a first image obtained by said imaging means when said X-ray radiating means radiates no X-rays, a second image obtained by said imaging means immediately before the first image when X-rays are radiated is displayed.

7. An apparatus according to claim 1, in which said control means includes input means for adjusting the number of irradiation times, and changes the number of irradiation times within a range of 15 to 24 times per second in accordance with an input from said input means.

8. An apparatus according to claim 7, in which said input means is a switch for selecting a portion of interest.

9. An X-ray diagnostic apparatus comprising:
   first X-ray radiating means for repeatedly radiating pulse-like X-rays during a fluoroscopic imaging operation;
   first imaging means for repeatedly imaging X-rays radiated from said first X-ray radiating means and passing through an object to be examined at a predetermined frame period and successively outputting first image signals representing X-ray images obtained by the X-rays repeatedly radiated in each frame period;
   first display means for displaying X-ray fluoroscopic images on the basis of the first image signals successively outputted by said first imaging means;
   second X-ray radiating means for repeatedly radiating pulse-like X-rays during a fluoroscopic imaging operation;
   second imaging means for repeatedly imaging X-rays radiated from said second X-ray radiating means and passing through the object to be examined at a predetermined frame period and successively outputting second image signals representing X-ray images obtained by the X-rays repeatedly radiated in each frame period;
   second display means for sequentially displaying X-ray fluoroscopic images on the basis of the second image signals successively outputted by said second imaging means; and
   control means for controlling said first and second X-ray radiating means such that said first and second X-ray radiating means radiate X-rays at different timings, and such that said first and second X-ray radiating means do not radiate X-rays in at least one frame period during the fluoroscopic imaging operation.

10. An apparatus according to claim 9, in which the number of frames is 30 per second.

11. An apparatus according to claim 9, in which said control means controls said first and second X-ray radiating means such that the number of irradiation times is not less than one-half the number of frames.

12. An apparatus according to claim 9, in which said control means controls said first and second X-ray radiating means such that X-rays are radiated at the same period as the frame period, and that the X-ray irradiation is paused once for every n irradiations.

13. An apparatus according to claim 9, in which said control means controls said first and second X-ray radiating means such that X-rays are repeatedly radiated at a period longer than the frame period.

14. An apparatus according to claim 9, in which said control means controls said first display means such that, in place of a first image obtained by said first imaging means when said first X-ray radiating means radiates no X-rays, a second image obtained by said first imaging means immediately before the first image when X-rays are radiated is displayed, and controls said second display means such that, in place of a third image obtained by said second imaging means when said second X-ray radiating means radiates no X-rays, a fourth image obtained by said second imaging means immediately before the third image when X-rays are radiated is displayed.

15. An apparatus according to claim 9, in which said control means includes input means for adjusting the number of irradiation times, and changes the number of irradiation times of said first and second X-ray radiating means within a range of 15 to 24 times per second in accordance with an input from said input means.

16. An apparatus according to claim 15, in which said input means is a switch for selecting a portion of interest.

17. An X-ray diagnostic apparatus comprising:

X-ray radiating means for repeatedly radiating pulse-like X-rays;

imaging means for repeatedly imaging X-rays passing through an object to be examined at a predetermined frame period;

image processing means for processing the images obtained by said imaging means;

display means for sequentially displaying the images processed by said image processing means; and control means for controlling said X-ray radiating means such that the number of X-ray irradiation times per unit time is smaller than the number of frames which said imaging means images per unit time, and controls said image processing means such that an image obtained by said imaging means when said X-ray radiating means radiates no X-rays is not processed.

18. An apparatus according to claim 17, in which the number of frames is 30 per second.

19. An apparatus according to claim 17, in which said control means controls said X-ray radiating means such that the number of irradiation times is not less than one-half the number of frames.

20. An apparatus according to claim 17, in which said control means controls said X-ray radiating means such that X-rays are radiated at the same period as the frame period and the X-ray irradiation is paused once for every n irradiations.

21. An apparatus according to claim 17, in which said control means controls said X-ray radiating means such that X-rays are radiated repeatedly at a period longer than the frame period.

22. An apparatus according to claim 17, in which said control means includes input means for adjusting the number of irradiation times, and changes the number of irradiation times within a range of 15 to 24 times per second in accordance with an input from said input means.

23. An apparatus according to claim 22, in which said input means is a switch for selecting a portion of interest.

24. An X-ray diagnostic apparatus comprising:

X-ray radiating means for repeatedly radiating pulse-like X-rays;

imaging means for repeatedly imaging X-rays passing through an object to be examined at a predetermined frame period;

display means for displaying X-ray fluoroscopic images on the basis of a plurality of images repeatedly obtained by said imaging means; and inputting means for inputting a number of times the X-rays are to be radiated per unit time; and control means for controlling said X-ray radiating means such that said X-ray radiating means radiates the X-rays the number of times which is input by said inputting means, thereby changing a ratio of the number of frames by which said imaging means repeatedly performs an imaging operation per unit time to the number of times said X-ray radiating means radiates the X-rays per unit time.

* * * * *